United States Patent [19]
Ahmed et al.

[11] Patent Number: 5,789,351
[45] Date of Patent: Aug. 4, 1998

[54] COMPOSITIONS USEFUL FOR TREATING OIL-BEARING FORMATION

[75] Inventors: Iqbal Ahmed; Ahmad Moradi-Araghi, both of Bartlesville, Okla.

[73] Assignee: Phillips Petroleum Company, Bartlesville, Okla.

[21] Appl. No.: 699,302

[22] Filed: Aug. 19, 1996

Related U.S. Application Data

[60] Division of Ser. No. 649,569, May 17, 1996, Pat. No. 5,642,783, which is a continuation-in-part of Ser. No. 422,394, Apr. 14, 1995, Pat. No. 5,547,025.

[51] Int. Cl.$^6$ .................... E21B 43/26; C09K 3/00
[52] U.S. Cl. .................... 507/203; 507/209; 507/219; 507/225; 507/260; 507/267; 507/903; 507/215; 166/295
[58] Field of Search .................... 507/203, 903, 507/219, 225, 260, 267, 209, 215; 166/295

[56] References Cited

U.S. PATENT DOCUMENTS

| | | | |
|---|---|---|---|
| 4,524,829 | 6/1985 | Hanlon et al. | 166/294 |
| 5,478,802 | 12/1995 | Ahmed Moradi et al. | 507/203 |
| 5,547,025 | 8/1996 | Ahmed et al. | 166/295 |

Primary Examiner—C. H. Kelly
Attorney, Agent, or Firm—Lucas K. Shay

[57] ABSTRACT

A process for altering the permeability of a subterranean formation comprises injecting into the subterranean formation a gelling composition which comprises a carboxylate-containing polymer, a crosslinking agent, and a liquid such as a produced brine wherein the polymer forms a gel in the formation, in the presence of the crosslinking agent. The polymer can have a molecular weight of from about 10,000 to about 30,000,000, contain about 0.01 to about 10 mole % of a carboxylate group, and be present in the gelling composition in the range of from about 100 to about 100,000 mg per liter of the composition.

27 Claims, 1 Drawing Sheet

COMPOSITIONS USEFUL FOR TREATING OIL-BEARING FORMATION

This application is a division of application Ser. No. 08/649,569, filed May 17, 1996, now U.S. Pat. No. 5,642,783 which is a continuation-in-part of application Ser. No. 08/422,394, filed on Apr. 14, 1995, now U.S. Pat. No. 5,547,025.

FIELD OF THE INVENTION

The present invention relates to a process such as, for example, for altering permeability and correcting water coning problems of hydrocarbon-bearing subterranean formations in oil field operations.

BACKGROUND OF THE INVENTION

It is well known to those skilled in the art that gelled or crosslinked water-soluble polymers are useful in enhanced oil recovery and other oil field operations. They have been used to alter the permeability of underground formations in order to enhance the effectiveness of water flooding operations. Generally, polymers along with an appropriate crosslinking system are injected in an aqueous solution into the formation. The polymers then permeate into and gel in the regions having the highest water permeability.

Because of environmental concerns as well as cost for disposing of a produced brine, which is defined as the brine co-produced with oil and gas, it is desirable to utilize the produced brine as the aqueous solution used for the polymers and appropriate crosslinking systems. Use of produced brines eliminates not only the cost associated with acquiring and pre-treating fresh water for use as the aqueous solution but also the disposal cost for the produced brine. Most produced brines are known to be hard brines, i.e., those having a divalent cation concentration greater than 1000 ppm.

Although a chromium(III) salt which is not as toxic as a chromium(VI) salt can be used as crosslinking agent, it is not an environmentally desirable compound and its use may require additional costs to assure the integrity of the injection wells to avoid contamination of ground water sources. Other multivalent metallic compounds such as compounds of zirconium, titanium, ferric or ferrous, aluminum, or combinations of any two or more thereof have been used to produce gels with synthetic water-soluble polymers or natural polymers for various oil-field operations such as, for example, water shut-off and permeability corrections for reservoirs. Usually these metallic ions crosslink gellable polymers through the interaction with the oxygen atoms of the polymer molecules. Therefore, the gellable polymers generally contain some carboxylate groups. Generally, the gellable polymers used such as, for example, polyacrylamide are of high molecular weight and contain high degrees of hydrolysis, i.e., contain 10–30 mole % carboxylate groups. However, these high molecular weight and/or high mole % carboxylate groups containing polymers gel almost instantly in the presence of the above-described multivalent metallic compounds. Such fast gelation rate renders the application of gelling compositions containing these polymers and multivalent metallic compounds not useful in many oil-field applications such as, for example, water shut-offs and permeability reductions.

Many processes have been developed to delay the gelation of gelling compositions by adding a gelation delaying agent to the gelling compositions. However, a gelation delaying agent is not inexpensive and a gelation delaying agent often adds appreciable costs to oil field operation. Therefore, a more environmentally suitable process using a gelling composition that can form stable gels in produced brines for near-wellbore as well as in-depth treatments and that does not require a gelation delaying agent is highly desirable.

SUMMARY OF THE INVENTION

An object of the invention is to provide a process for altering the permeability of hydrocarbon-bearing formations. Another object of the invention is to provide a process for altering the permeability of hydrocarbon-bearing formations by using a gelling composition that is environmentally suitable for use in oil-field operations. A further object of the invention is to provide a process for altering the permeability of hydrocarbon-bearing formation with a gelling composition that does not require a gelation delaying agent. Still another object of the invention is to provide a process for wellbore treatment employing a gelling composition that is environmentally suitable for oil-field operations. An advantage of the invention is the invention process does not employ a gelation delaying agent, yet achieves the alteration of permeability of the formations or other oil-field applications. Other objects, features, and advantages will become more apparent as the invention is more fully disclosed hereinbelow.

According to the present invention, a process for treating hydrocarbon-bearing formation is provided which comprises injecting into the formation a gelling composition which comprises a carboxylate-containing polymer, a crosslinking agent, and a liquid wherein the gelling composition forms gels when injected into the formation.

DETAILED DESCRIPTION OF THE INVENTION

Figure 1:
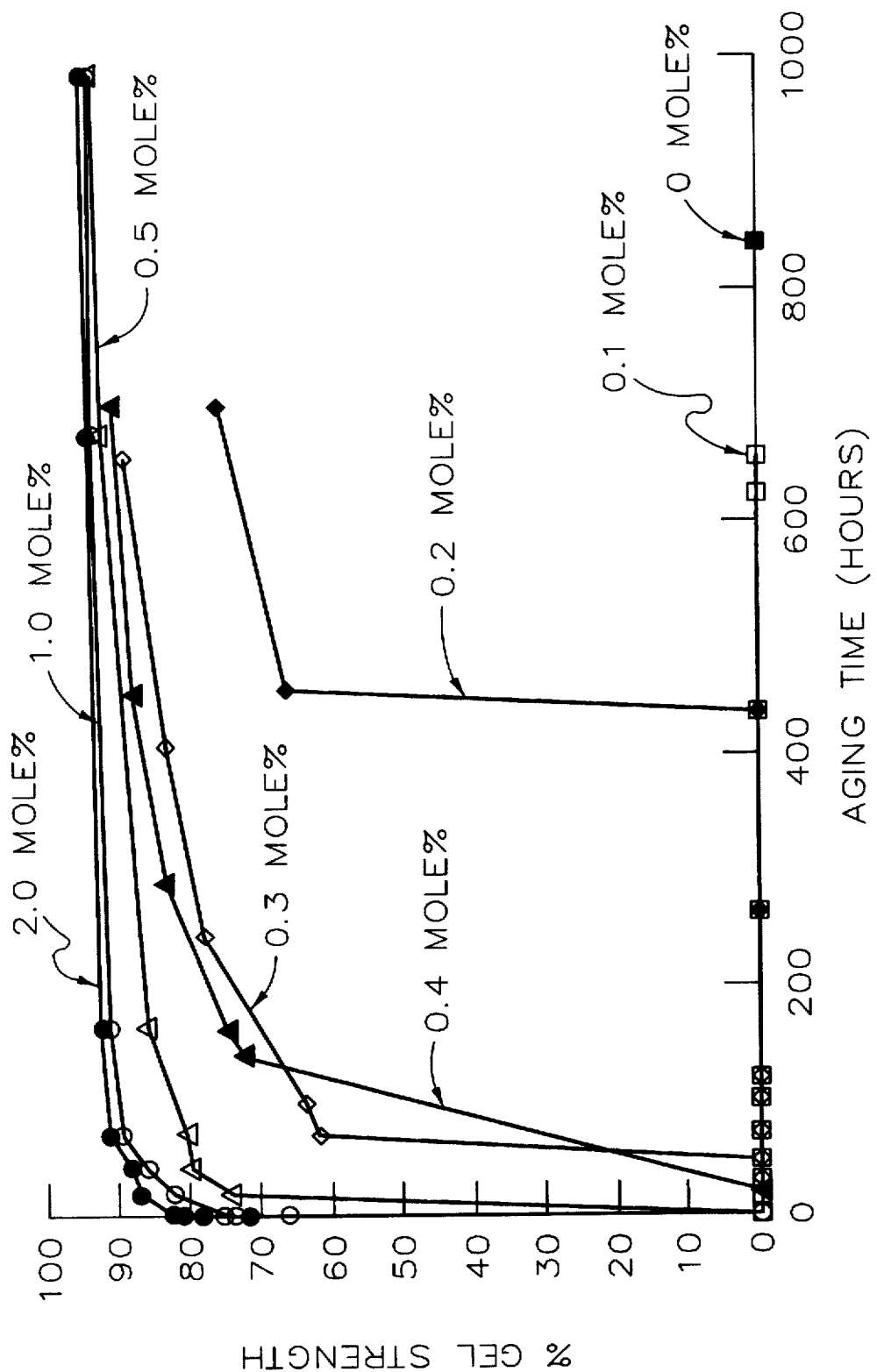
FIG. 1 is a graphic representation of gel strength of gels formed as a function of aging time at 120° F. in hard brine (a brine having 18.5% total dissolved solids or TDS; the brine was obtained from C.B. Long Unit, Stonewall County, Tex.. The gels were formed from acrylamide-acrylic acid copolymers having various mole percent (%) as shown, a zirconium lactate obtained from Benchmark Research and Technology, Inc., Midland, Tex. crosslinking agent, and the brine. The concentration of the copolymer was 5,000 mg/l (ppm) and that of the crosslinking agent, measured as zirconium cation, was 250 ppm.

According to the present invention, a process is provided for treating a hydrocarbon-bearing formation which comprises injecting a gelling composition which comprises, or consists essentially of, or consists of, a carboxylate-containing gellable polymer, a crosslinking agent, and a liquid. Generally the gellable polymer is a water soluble polymer and is present in an aqueous solution containing a liquid. The term "liquid" used herein is interchangeable with "water" and generically refers to, unless otherwise indicated, pure water, regular tap water, a solution or suspension wherein the solution or suspension contain a variety of salts. A typical solution is a produced brine. The term "hydrocarbon" denotes any hydrocarbons which may or may not be oxygenated or substituted with appropriate substituents. The hydrocarbon may also contain minor components such as, for example, sulfur. The presently preferred hydrocarbons are crude oil and gas. The treatment includes, but is not limited to, permeability alteration, water coning correction, water shutoff, gas shutoff, and zone abandonment.

The produced brine is defined as the brine co-produced with oil or gas, or both, which generally is a hard brine, i.e., containing at least 1,000 ppm of $Ca^{+2}$, $Ba^{+2}$, $Mg^{+2}$, or $Sr^{+2}$, or combinations thereof. A produced brine generally contains high salinity of from about 1 weight % to about 30% total dissolved solids. A produced brine generally is contaminated with oil or gas, or both. The gellable polymer generally gels well in produced brines having a salinity of from about 0.3% to about 27%.

The term "carboxylate-containing polymer" used herein refers to, unless otherwise indicated, a polymer that contains at least one free carboxylic group or a carboxylate group in which the proton of the carboxylic acid is substituted with an ammonium radical, an alkali metal, an alkaline earth metal, or combinations of any two or more thereof. As used herein, the term "copolymer" also includes copolymer and tetrapolymer.

According to the present invention, the molecular weight of the carboxylate-containing polymers can generally be at least about 10,000 and less than about 30,000,000, preferably less than about 25,000,000, and most preferably less than about 20,000,000. The mole percent (%) of the carboxylate group is generally in the range of from about 0.01 to less than about 5, preferably about 0.01 to less than about 2, and most preferably about 0.1 to about 1. However, if the molecular weight of a suitable polymer is about 1,000,000 or less, the mole % of the carboxylate group can be in the range of from about 0.01 to about 10%, preferably about 0.1 to about 10%, and most preferably 0.1 to 5%.

According to the present invention, the gelation rate is defined as the rate at which gel particles are formed. At the onset of gelation these particles are small enough that the gelling solution still flows, but these particles can be detected from apparent flow characterization caused by the apparent viscosity change. The small particles grow to larger granules with time and become strong enough to hold fluids within their structures which restrict the free flowing characterizing of the gelling solution and thus, develop tongue length. The gelation rate is generally longer than about 1 hour, preferably longer than about 2 hours, more preferably longer than about 3 hours, even more preferably longer than about 4 hours, and most preferably longer than 10 hours. Generally, no appreciable gel strength, as defined in Example I, is observed until a tongue length can be measured.

Carboxylate-containing polymers suitable for use in this invention are those capable of gelling in the presence a crosslinking agent such as, for example, a multivalent metallic compound. Polymers suitable for use in this invention, i.e., those capable of gelling in the presence of a crosslinking agent, include, but are not limited to, biopolysaccharides, cellulose ethers, and acrylamide-containing polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and carboxymethyl cellulose (CMC) for their ready availability.

Suitable biopolysaccharides are disclosed in U.S. Pat. No. 4,068,714 (herein incorporated by reference). Particularly preferred is polysaccharide B-1459 and xanthan gums which are biopolysaccharides produced by the action of *Xanthomonas campestris* bacteria. This biopolysaccharide is commercially available in various grades under the tradename "KELZAN®" (Kelco Company, Los Angeles, Calif.) and "FLOCON" 4800 (Pfizer, Groton, Conn.) and they are readily available.

Suitable acrylamide-containing polymers which also contain pendant carboxylate groups are disclosed in U.S. Pat. No. 3,749,172 (herein incorporated by reference). Particularly preferred are the so-called partially hydrolyzed polyacrylamides possessing pendant carboxylate groups through which crosslinking can take place. Thermally stable carboxylate-containing polymers of acrylamide, partially hydrolyzed polyacrylamide, such as copolymers of N-vinyl-2-pyrrolidone and acrylamide; copolymers of sodium-2-acrylamido-2-methylpropanesulfonate, acrylamide, and N-vinyl-2-pyrrolidone; copolymers of N-vinyl-2-pyrrolidone and acrylamide, and sodium acrylate, copolymers of acrylamide, sodium-2-acrylamido-2-methylpropanesulfonate, and sodium acrylate; and copolymers of sodium-2-acrylamido-2-methylpropanesulfonate and acrylamide; copolymers of sodium-2-acrylamido-2-methylpropanesulfonate and acrylamide, and sodium acrylate; copolymers of sodium-2-acrylamido-2-methylpropanesulfonate, acrylamide, N-vinyl-2-pyrrolidone, and sodium acrylate; are particularly preferred for applications in high salinity environments at elevated temperatures for stability. Selected carboxylate-containing copolymers also are useful in the present process, such as copolymers derived from acrylamide and N-vinyl-2-pyrrolidone comonomers with lesser amounts of termonomers such as vinyl acetate, vinylpyridine, styrene, methyl methacrylate, and other polymers containing acrylate groups.

Generally, suitable polymers contain some carboxylate group if the polymers are used to crosslink with multivalent cations such as Cr, Zr, Ti, Fe, and Al cations. In the absence of the carboxylate group, the polymers can also be used to crosslink with organic crosslinkers such as, for example, phenol and formaldehyde, or precursors thereof, or furfuryl alcohol and formaldehyde, or an aminobenzoic acid and formaldehyde. Precursors of formaldehyde such as, for example, hexamethylenetetramine can be, and are more preferably, used in place of formaldehyde.

Other miscellaneous polymers suitable for use in the present invention include partially hydrolyzed polyacrylonitriles, copolymers of acrylate and styrene sulfonate, or combinations of any two or more thereof.

The presently preferred carboxylate-containing polymers are CMHEC, CMC, xanthan gum, and the acrylamide-containing polymers, particularly the partially hydrolyzed polyacrylamides, polymers containing acrylamide, ammonium or alkali metal salts of acrylic acid, and polymers containing ammonium or alkali metal salts of acrylic acid, N-vinyl-2-pyrrolidone, and sodium-2-acrylamido-2-methylpropanesulfonate. The ammonium or alkali metal salts of acrylic acid are herein referred to as acrylate, as in the claims.

Any crosslinking agents such as, for example, a multivalent metallic compound that are capable of crosslinking the gellable carboxylate-containing polymer in the hydrocarbon-bearing formations can be used in the process of the present invention. The presently preferred multivalent metal compound is a metal compound selected from the group consisting of a complexed zirconium compound, a complexed titanium compound, and mixtures thereof. Examples of suitable multivalent metallic compounds include, but are not limited to, zirconium citrate, zirconium complex of hydroxyethyl glycine, ammonium zirconium fluoride, zirconium 2-ethylhexanoate, zirconium acetate, zirconium tartarate, zirconium malonate, zirconium propionate, zirconium neodecanoate, zirconium acetylacetonate, tetrakis(triethanolamine)zirconate, zirconium carbonate, ammonium zirconium carbonate, zirconyl ammonium carbonate, zirconium lactate, titanium acetylacetonate, titanium ethylacetoacetate, titanium citrate, titanium triethanolamine, ammonium titanium lactate, aluminum citrate, chromium citrate, chromium acetate, chromium propionate, and combinations thereof. The presently most preferred crosslinking agent is zirconium lactate, zirconium citrate, tetrakis(triethanolamine)zirconate, or zirconium complex of hydroxyethyl glycine, zirconium tartarate, zirconium malonate, zirconium propionate, or combinations thereof. These compounds are commercially available.

According to the present invention, the crosslinking agent can also contain a complexing ligand if necessary to further delay the rate of gelation. Preferably, however, the crosslinking agent does not contain such complexing agent. The complexing ligand useful for the present invention to retard the rate of gelation is generally a carboxylic acid containing one or more hydroxyl groups and salts thereof. The complexing ligand can also be an amine that has more than one functional group and contains one or more hydroxyl groups and that can chelate the zirconium or titanium moiety of the zirconium or titanium compounds described above. Examples of suitable complexing ligands include, but are not limited to, hydroxyethyl glycine, lactic acid, ammonium lactate, sodium lactate, potassium lactate, citric acid, ammonium, potassium or sodium citrate, isocitric acid, ammonium, potassium or sodium isocitrate, malic acid, ammonium, potassium or sodium malate, tartaric acid, ammonium, potassium or sodium tartrate, triethanolamine, malonic acid, ammonium, potassium or sodium malonate, and mixtures thereof. The presently preferred complexing ligands are citric acid, lactic acid, tartaric acid and salts thereof, triethanolamine, and hydroxyethyl glycine because of their ready availability and low cost.

The concentration or amount of the carboxylate-containing polymer in the gelling composition can range widely and be as suitable and convenient for the various polymers, and for the degree of gelation needed for particular reservoirs. Generally, the concentration of polymer in an aqueous solution is made up to a convenient strength of about 100 to 100,000 mg/l (ppm), preferably about 200 to 70,000 ppm, and most preferably 1,000 to 50,000 ppm.

Any suitable procedures for preparing the aqueous admixtures of the gellable polymer can be used. Some of the polymers can require particular mixing conditions, such as slow addition of finely powdered polymer into a vortex of stirred brine, alcohol prewetting, protection from air (oxygen), preparation of stock solutions from fresh rather than salt water, as is known for such polymers.

The concentration of crosslinking agent used in the present invention depends largely on the concentrations of polymer in the composition. Lower concentrations of polymer, e.g., require lower concentrations of the crosslinking agent. Further, it has been found that for a given concentration of polymer, increasing the concentration of crosslinking agent generally substantially increases the rate of gelation. The concentration of crosslinking agent in the injected slug varies generally over the broad range of about 1 mg/l (ppm) to about 5,000 ppm, preferably over the range of about 1 ppm to about 3,000 ppm, and most preferably 1 ppm to 2,000 ppm.

The concentration of the complexing ligand, if present, in the composition also depends on the concentrations of the water-soluble polymer in the composition and on the desired rate of gelation. Generally, the lower the concentration of the complexing ligand is, the faster the gelation rate is.

The use of gelled polymers to alter the water permeability of underground formations is well known to those skilled in the art. Generally, an aqueous solution containing the polymer and a crosslinker is pumped into the formation so that the solution can enter into the more water swept portions of the formation and alter water permeability by gelling therein.

According to the process of the present invention, an aqueous gelling composition comprising a crosslinking agent and a gellable carboxylate-containing polymer is injected into an injection or production well. The definition and scope of the crosslinking agent and polymer are the same as those described above. The amount of the aqueous gelling composition injected can vary widely depending on the treatment volume injected. The amount of the gellable polymer injected is also dependent on the gel strength desired, same as that described for the crosslinking agent.

The nature of the underground formation treated is not critical to the practice of the present invention. The described gelling composition can be injected into a formation having a temperature range of from about 70° F. to about 300° F. when the polymer used is a gelling copolymer suitable for the brine used at the reservoir temperature or temperatures in the range of from about 70° F. to about 300° F. for partially hydrolyzed polyacrylamide, xanthan gum, CMC, or CMHEC, preferably about 80° F. to about 180° F., and most preferably 80° F. to 170° F. for best results. Any means known to one skilled in the art can be used for injecting the gelling composition and polymer solution.

Examples provided hereinbelow are intended to assist one skilled in the art to further understand the invention and should not be considered limitative.

EXAMPLE I

The purpose of this example is to illustrate the gelation of a composition comprising a water-soluble polymer, a crosslinking agent, and a brine, and to use this example as a control.

Polyacrylamide solutions (0.5%) were prepared by mixing sufficient amount of the polymer in a synthetic brine having 1.1%, total dissolved solids (TDS; 1% NaCl and 0.1% $CaCl_2$), 11% TDS (10% NaCl and 1% $CaCl_2$), and 22% TDS (20% NaCl and 2% $CaCl_2$). Then 20 ml samples of each polymer solution were placed in three vials. Each vial was then charged with tetrakis(triethanolamine) zirconate. The vials were placed upright in test tube racks and then placed in ovens heated to and held at 120° F. Periodically, the vials were removed from the oven and the mechanical strength of the gels was determined.

As crosslinking developed, small microgels of granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each vial horizontally allowing the gelling composition to flow to its equilibrium position and then measuring the length of the tongue formed. As gelation progressed with time, stronger gels and shorter tongue lengths were developed. The gel strength is expressed mathematically as Percent Gel Strength=$(AL-TL) \times 100/AL$ where AL equals ampule length (in centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0. The gel strength results are shown in Table I.

TABLE I

Gelation of Polyacrylamide[a] in Brines with 250 ppm Zirconium ("ZIRTECH TE"[b]) at 120° F.

| In 1.1% Brine | | In 11% Brine | | In 22% Brine | |
|---|---|---|---|---|---|
| Aging Time (days) | Gel Strength (%) | Aging Time (days) | Gel Strength (%) | Aging Time (days) | Gel Strength (%) |
| 0.06 | 0.00 | 0.07 | 64.4 | 0.06 | 84.0 |
| 0.15 | 64.9 | 0.17 | 70.7 | 0.16 | 84.0 |
| 0.81 | 71.6 | 0.84 | 77.3 | 0.84 | 86.7 |
| 2.90 | 78.7 | 3.90 | 80.4 | 3.90 | 87.1 |
| 4.90 | 81.3 | 5.90 | 83.6 | 5.80 | 87.6 |
| 7.00 | 81.3 | 7.90 | 84.4 | 7.80 | 88.4 |
| 11.30 | 83.6 | 14.90 | 85.3 | 14.90 | 90.7 |
| 18.20 | 84.4 | 22.00 | 86.2 | 21.90 | 88.9 |
| 25.20 | 84.0 | 29.00 | 87.1 | 28.90 | 91.1 |
| 32.00 | 86.2 | 36.00 | 87.1 | 36.00 | 91.1 |
| 39.00 | 86.2 | 43.00 | 85.8 | 43.00 | 91.6 |
| 46.00 | 87.6 | 77.00 | 87.1 | 70.00 | 90.7 |
| 53.00 | 88.4 | 152.00 | 85.8 | 146.00 | 77.8 |
| 87.00 | 88.4 | 246.00 | 82.7 | 193.00 | 77.8 |
| 162.00 | 88.4 | | | | |
| 256.00 | 88.4 | | | | |

[a]Polymer used was "POLYDIA 1041" (% hydrolysis = 3–6; inherent viscosity = 18 dL/g) obtained from Nitto Chemical Industry Co., Tokyo, Japan.
[b]"ZIRTECH TE" is a triethanolamine complex of zirconium obtained from Benchmark Research and Technology, Inc., Midland Texas The results shown in Table I indicate that increasing the salinity of the brines from 1.1% to 22% significantly increased the gelation rate. For example, aging for 1.4 hours (0.06 day), the gel strength in 1.1% brine was 0.0, the gel strength in 22% brine, for same aging period, increased to 84%. However, upon prolonged incubation, the gels formed in lower salinity brine appear to be stronger than those formed in higher salinity brines. For example, upon aging for 256 days in 1.1% brine, the gel strength was 88.4%. On the other hand, upon aging for 193 days in 22% brine, the gel strength was only 77.8%.

EXAMPLE II

This example illustrates the gelation of water-soluble polymer with a complexed zirconium compound in a produced brine.

The runs were carried out the same as those described in Example I with the exception that the brine used as a produced brine obtained from Tank Battery 41 of North Burbank Unit Oil Field, Shidler, Okla. The produced brine has a TDS of 5%. Gel strength of the gels aged at 120° F., 150° F. and 175° F. is shown in Table II.

TABLE II

Gelation of Polyacrylamide in a Produced Brine with "ZIRTECH TE"[a] (250 ppm Zr) at 120° F., 150° F. and 175° F.

| | Gel Strength (%) | | |
|---|---|---|---|
| Aging Time (days) | 120° F. | 150° F. | 175° F. |
| 0.06 | 0.0 | 65.8 | 84.9 |
| 0.17 | 0.0 | 74.7 | 92.4 |
| 0.83 | 67.6 | 83.6 | 94.2 |

TABLE II-continued

Gelation of Polyacrylamide in a Produced Brine with "ZIRTECH TE"[a] (250 ppm Zr) at 120° F., 150° F. and 175° F.

| | Gel Strength (%) | | |
|---|---|---|---|
| Aging Time (days) | 120° F. | 150° F. | 175° F. |
| 1.20 | 72.4 | 85.3 | 95.1 |
| 1.90 | 74.2 | 87.1 | 96.0 |
| 2.80 | 77.8 | 88.4 | 95.6 |
| 7.80 | 80.4 | 89.8 | 96.4 |
| 20.00 | 83.6 | 91.6 | 96.9 |
| 26.90 | 84.9 | 92.4 | 97.3 |
| 34.00 | 84.9 | 92.0 | 96.9 |
| 49.00 | 86.2 | 93.8 | 91.1 |
| 66.00 | 87.6 | 93.3 | 86.2 |
| 97.00 | 89.3 | 93.8 | Syneresis |
| 125.00 | 88.4 | 93.8 | Syneresis |

[a]See footnote b, Table I.

Table II shows that the lower the aging temperature, the slower the gelation rate. For instance, no gel was observed at 120° F. until after the gelling composition had been aged for more than 4.1 hours (0.17 day). It gelled, however, within 1.4 hours of aging at 150° F. as well as at 175° F. Table II further indicates that the gelation rate at higher temperature, i.e. 150° F. to 175° F., needed to be delayed so that the components of the gelling composition can be simultaneously injected into an oil well.

EXAMPLE III

This example demonstrates that lactic acid can be used in a gelling composition comprising polyacrylamide and a complexed zirconium compound, in a produced brine to delay the gelation rate.

The runs were carried out the same as those described in Example II except that zirconium lactate was used as the crosslinking agent and lactic acid was used as a complexing ligand to delay gelation. Results presented in Table III indicate that lactic acid was an effective complexing ligand for delaying the gelation of a gelling composition.

TABLE III

Gelation of Polyacrylamide in a Produced Brine with 283 ppm Zr (Zirconium Lactate, "ZIRTECH LA"[a]) at 120° F.

| 0 ppm Lactic Acid | | 1650 ppm Lactic Acid | |
|---|---|---|---|
| Aging Time (days) | Gel Strength (%) | Aging Time (days) | Gel Strength (%) |
| 0.04 | 0.0 | 0.04 | 0.0 |
| 0.14 | 72.0 | 0.08 | 0.0 |
| 0.22 | 74.7 | 0.16 | 0.0 |
| 0.89 | 78.2 | 0.27 | 0.0 |
| 5.90 | 82.2 | 0.88 | 0.0 |
| 10.20 | 82.2 | 1.10 | 0.0 |
| 13.20 | 82.7 | 2.20 | 0.0 |
| 20.90 | 78.7 | 3.20 | 0.0 |
| 38.00 | 83.1 | 6.20 | 0.0 |
| 59.00 | 82.7 | 13.90 | 0.0 |
| 104.00 | 84.4 | 31.00 | 69.8 |
| 240.00 | 83.1 | 52.00 | 82.2 |
| | | 97.00 | 89.3 |
| | | 233.00 | 95.6 |

[a]"ZIRTECH LA" is a zirconium lactate obtained from Benchmark Research and Technology, Inc., Midland, Texas.

EXAMPLE IV

This example illustrates the relationship of gelation of a gelling composition and the mole % of carboxylate group of a gellable polymer used in the gelling composition.

The runs were carried out the same as those described in Example I with the exception that the polymers used had different mole percent of carboxylate group, the produced brine used contained 18.5% TDS, and zirconium lactate was used as crosslinking agent. The results are shown in FIG. 1.

As shown in FIG. 1, a gelling composition containing 0.5 mole % or higher carboxylate gelled in less than 2 hours and the gel strength reached about 75% in about 5 hours when the zirconium ion concentration was 250 mg/l (ppm). FIG. 1 also shows that essentially no gels were formed if the gelling composition contained 0 mole % or 0.1 mole % carboxylate group.

EXAMPLE V

This example illustrates that a gelling composition containing a high molecular weight polyacrylamide having high degree of hydrolysis forms gels in less than 1.2 hours.

The runs were carried out the same as those described in Example I with the exception that a different polyacrylamide, various concentrations of zirconium lactate was used as crosslinking agent, and a produced brine FKWO (obtained from the South Cowden Unit, Ector County, Tex.; 7.86% TDS) was used in gelling composition shown in Table IV.

Table IV shows that, with as low as 250 ppm of zirconium, gels were formed in 1.2 hours.

TABLE IV

Bulk Gel Test With "OFXC-1163"[a] and "ZIRTECH LA110"[b] in Aerated FKWO Water at 120° F.

| Polymer Concn. ppm | Zr Concn. ppm | 0 hr | 1.2 hr | 2.0 hr | 4.4 hr | 5.8 hr | 23.2 hr | 15.0d |
|---|---|---|---|---|---|---|---|---|
|  |  |  |  | Gel Strength (%) |  |  |  |  |
| 5000 | 250 | NG | S-PG | PG | PG | PG | PG | PG |
| 5000 | 500 | NG | S-PG | PG | 63.6 | 65.8 | 74.7 | 81.3 |
| 5000 | 750 | NG | PG | PG | PG | 63.1 | 78.2 | 86.7 |
| 5000 | 1000 | NG | S-PG | PG | PG | PG | 75.1 | 89.8 |
| 5000 | 1500 | NG | S-PG | PG | PG | PG | 68.4 | 87.6 |
| 5000 | 2000 | T | S-PG | S-PG | PG | PG | 61.8 | 82.7 |

NG = No gel, T = Thick, SG = Slight gel, PG = Partial gel, S-PG = Sligh to partial gel.
[a]"OFXC-1163" is a partially hydrolyzed polyacrylamide, having a molecular weight of about (10–15) × 10$^6$ and 5–7 mole % carboxylate group, obtained from American Cyanamid Company, West Paterson, New Jersey.
[b]See footnote a, Table III.

EXAMPLE VI

This example demonstrates that the higher degree of hydrolysis is, i.e., higher mole % content of carboxylate of the polymer, the faster the gelation rate.

The runs were carried out the same as those described in Example V with the exception that a different polyacrylamide and a different produced brine shown in Table V were used. The results in Table V show that in less than 1.5 hours, the gelling composition containing as low as 250 ppm of zirconium formed strong gels.

TABLE V

Bulk Gel Test With Tiorco "UNIPERM 420"[a] and "ZIRTECH LA110"[b] in Aerated FKWO Water at 120° F.

| Polymer Concn. ppm | Zr Concn. ppm | 0 hr | 1.4 hr | 2.9 hr | 4.4 hr | 20.8 hr | 16.9d |
|---|---|---|---|---|---|---|---|
|  |  |  |  | Gel Strength (%) |  |  |  |
| 5000 | 250 | T | 76.9 | 79.1 | 80.0 | 83.1 | 85.3 |
| 5000 | 500 | T | 84.0 | 86.7 | 88.4 | 92.4 | 93.8 |
| 5000 | 750 | T | 83.6 | 88.0 | 90.7 | 95.1 | 95.6 |
| 5000 | 1000 | T | 81.8 | 87.1 | 90.2 | 96.0 | 97.3 |
| 5000 | 1500 | T | 76.0 | 85.3 | 88.4 | 96.4 | 98.2 |
| 5000 | 2000 | T | 71.1 | 83.1 | 85.8 | 95.1 | 97.8 |

T = Thick
[a]Tiorco "UNIPERM 420" is a partially hydrolyzed polyacrylamide, having a molecular weight of about (13–14) × 10$^6$ and about 18 mole % carboxylate group, obtained from TIORCO, Inc., Englewood, Colorado.
[b]See footnote a, Table III.

EXAMPLE VII

This example illustrates a gelling composition containing a different produced brine also has very fast gelation rate.

The runs were carried out the same as those described in Exampe V except that a C.B. Long brine (obtained from C.B. Long Unit, Stonewall County, Tex.; 18.5% TDS) was used in place of FKWO brine. The results shown in Table VI indicate that the gelation rate of the gelling ere similar to the results shown in Table V.

TABLE VI

Bulk Gel Test With "OFXC-1163"[a] and "ZIRTECH LA110"[b] in C. B. Long Brine at 120° F.

| Polymer Concn. ppm | Zr Concn. ppm | 0 hr | 1.0 hr | 2.0 hr | 4.1 hr | 18.2 hr | 27.8d |
|---|---|---|---|---|---|---|---|
|  |  |  |  | Gel Strength (%) |  |  |  |
| 5000 | 250 | VT | 84.4 | 93.3 | 93.3 | 91.6 | 93.8 |
| 5000 | 500 | VT | 93.8 | 92.9 | 94.7 | 94.7 | 96.4 |
| 5000 | 750 | VT | 75.1 | 76.4 | 80.9 | 85.8 | 90.2 |
| 5000 | 1000 | VT | 65.3 | 71.6 | 77.3 | 80.0 | 83.1 |
| 5000 | 1500 | T | PG | 62.7 | 76.0 | 76.0 | 86.7 |

VT = Very thick, T = Thick, PG = Partial gel.
[a]See footnote a, Table IV.
[b]See footnote a, Table III.

EXAMPLE VIII

This example demonstrates that decreasing the mole % of carboxylate group in polyacrylamide significantly lowers the gelation rate of a gelling composition which does not contain a gelation delaying agent.

The runs were carried out the same as described in Example VII with the exception that a polyacrylamide having less than 1 mole % of carboxylate group was used. The results shown in Table VII demonstrate that strong gels did not form until after being aged for over 47 days.

TABLE VII

Bulk Gel Test with "CYTEC 4500"[a] and "ZIRTECH LA110"[b] in C. B. Long Brine at 120° F.

| Polymer Concn. ppm | Zr Concn. ppm | 0 hr | 1 hr | 2.0 hr | 3.0 hr | 4.2 hr | 22.5 hr | 47d | 71d |
|---|---|---|---|---|---|---|---|---|---|
| | | | | | Gel Strength (%) | | | | |
| 5000 | 250 | T | VT | SG | SG | SG | SG | PG | 69.8 |
| 5000 | 500 | T | T | VT | VT | SG | SG | PG | 75.1 |
| 5000 | 750 | T | T | T | T | VT | VT | PG | 62.2 |
| 5000 | 1000 | T | T | T | T | VT | VT | S-PG | PG |

T - Thick, VT - Very thick, SG = Slight gel, PG = Partial gel, S-PG = Slight partial gel.
[a]"CYTEC 4500" is a partially hydrolyzed polyacrylamide, having a molecular weight of about 15 × 10⁶ and less than 1 mole % carboxylate group, obtained from American Cyanamid Company, West Paterson, New Jersey.
[b]See footnote a, Table III.

EXAMPLE IX

This example shows that a gelling composition containing a low molecular weight polyacrylamide has a significantly lower gelation rate as compared to a gelling composition containing a high molecular weight polyacrylamide.

The runs were carried out the same as those described in Example VII except that a lower molecular weight polyacrylamide was used in the gelling composition. As shown in Table VIII, a composition containing a polyacrylamide having a molecular weight of about 300,000 had significantly lower gelation rate as compared to the results of Table VI. For example, with 250 ppm of zirconium in the composition, no strong gels were formed until the composition was aged for over 25 days.

TABLE VIII

Bulk Gel Test With Allied "COLLOIDS 254S"[a] "ZIRTECH LA110"[b] C. B. Long Brine at 120° F.

| Polymer Concn. ppm | Zr Concn. ppm | 0 hr | 1 hr | 2.2hr | 3.1 hr | 5.2 hr | 24.7 hr | 70d |
|---|---|---|---|---|---|---|---|---|
| | | | | Gel Strength (%) | | | | |
| 20000 | 250 | NG | NG | T | T | VT | S-PG | 93.8 |
| 20000 | 500 | NG | T | T | VT | S-PG | PG | 97.3 |
| 20000 | 750 | NG | T | T | VT | SG | PG | 97.8 |
| 20000 | 1000 | NG | T | T | T | T | S-PG | 97.8 |
| 20000 | 1500 | NG | T | T | T | T | T | 97.8 |

NG = No gel, T = Thick, VT = Very thick, SG = Slight gel, PG = Partial gel, S-PG = Slight to partial gel.
[a]Allied "COLLOIDS 254S" is a partially hydrolyzed polyacrylamide, having a molecular weight of about 300,000 and about 4-5 mole % carboxylate group, obtained from Allied Colloids, Inc., Sulfolk, Virginia.
[b]See footnote a, Table III.

EXAMPLE X

This example illustrates a synergistic effect of employing a carboxylate-containing polymer which has both a low molecular weight and a low mole % of carboxylate group.

The runs were carried out the same as those described in Example V except that a polyacrylamide having a molecular weight of less than 300,000 and containing about 0.3 mole % carboxylate group, and a produced brine obtained from Point Arguello, Santa Barbara, Calif. (TDS=2.63%) were used. The results shown in Table IX below demonstrate that, at 250 ppm of zirconium, no gels were formed after the composition was aged for 24 days.

TABLE IX

Bulk Gel Test With Allied "COLLOIDS DP-6193"[a] and "ZIRTECH LA110"[b] in Point Arguello Brine[c]

| Polymer Concn. ppm | Zr Concn. ppm | 0 hr | 1.1 hr | 2.7 hr | 6.0 hr | 22.5 hr | 2d | 24d |
|---|---|---|---|---|---|---|---|---|
| | | | | Tongue Length (TL), cm | | | | |
| 27500 | 250 | NG | NG | NG | NG | NG | NG | NG |
| 27500 | 500 | NG | NG | NG | NG | NG | NG | NG |
| 27500 | 750 | NG | NG | NG | NG | NG | NG | NG |
| 27500 | 1000 | NG | NG | NG | NG | NG | T | T |

NG = No gel, T = Thick.
[a]DP9-6193 is a polyacrylamide obtained from Allied Colloids, Inc., Sulfolk, Virginia which had a carboxylate content of about 0.3 mole % and a molecular weight of less than 300,000.
[b]See Table III, footnote a.
[c]Contained about 2.63% TDS and was obtained from Point Arguello, Santa Barbara, California.

EXAMPLE XI

This example shows the effect of carboxylate-containing polymers having high molecular weight of about 7×10⁶ to about 1.5×10⁷ and a relatively various hydrolysis levels on gelation rate.

The runs were carried out the same as those described in Example I except that the polymer used was a polymer as shown in Tables X-XIV with "ZIRTECH LA-110" (zirconium lactate supplied by Benchmark Research and Technology, Midland, Tex.) at 250 ppm Zr at 120° F. The polymers were obtained from Drilling Specialties Company, Bartlesville, Okla. and had molecular weights of from about 7×10⁶ to about 1.5×10⁷. The polymers used in these runs had different degrees of hydrolysis which are shown in the Tables as % H which substantially represents the mole % of carboxylate group available for crosslinking.

As the results in Tables X-XIV show, when the polymer used was 0.5% hydrolyzed, no measurable gel was formed in 0.95 day of aging. For the polymer with 1.0% hydrolysis, a measurable tongue length was observed in 0.27 day of aging. The polymer with 2.5% hydrolysis showed a measurable tongue length of 2 hours of aging. The polymers containing 5.0 and 10.0% hydrolysis produced gels within 1 hour of aging. These results clearly indicate that the rate of gelation increases with the degree of hydrolysis. Furthermore, the rate of gelation for the polymers containing 1.0% or less hydrolysis is slow enough to be of use for most well treatments.

TABLE X

Gelation of 5000 ppm Am[a]:NaAMPS[b]:NaA[c] Copolymer (% H = 0.5) in Pump Discharge Water[d] at 120° F. with "ZIRTECH LA-110" at 250 ppm Zr ion

| Days Aged | Tongue Length (cm) | % GS[e] |
|---|---|---|
| 0.05 | SG[f] | SG |
| 0.09 | S-PG[f] | S-PG |
| 0.13 | PG[f] | PG |
| 0.18 | PG | PG |
| 0.27 | PG | PG |
| 0.95 | PG | PG |
| 2.26 | 7.4 | 67.1 |
| 10.09 | 4.6 | 79.6 |
| 17.08 | 3.5 | 84.4 |
| 22.20 | 3.1 | 86.2 |
| 43.00 | 2.1 | 90.7 |

Am:NaAMPS:NaA wt % = 49.5:50:0.5
[a]Am = acrylamide
[b]NaAMPS = sodium-2acrylamido-2-methylpropanesulfonate.
[c]NaA = sodium acrylate.
[d]Pump discharge water was collected from C.B. Long Unit, Stonewall County, Texas (total dissolved solids = 18.5%).
[e]GS = gel strength.
[f]SG = slight gel, PG = partial gel, S-PG = slight to partial gel.

TABLE XI

Gelation of 5000 ppm Am[a]:NaAMPS[b]:NaA[c] Copolymer (% H = 1.0) in Pump Discharge Water[d] at 120° F. with "ZIRTECH LA-110" at 250 ppm Zr ion

| Days Aged | Tongue Length (cm) | % GS[e] |
|---|---|---|
| 0.05 | PG[f] | PG |
| 0.08 | PG | PG |
| 0.13 | PG | PG |
| 0.21 | PG | PG |
| 0.27 | 8.5 | 62.2 |
| 0.95 | 7.0 | 68.9 |
| 9.19 | 4.3 | 80.9 |
| 16.05 | 3.7 | 83.6 |
| 21.22 | 3.0 | 86.7 |
| 42.00 | 2.4 | 89.3 |

Am:NaAMPS:NaA wt % = 49.0:50:1.0
[a]Am = acrylamide.
[b]NaAMPS = sodium-2acrylamido-2-methylpropanesulfonate.
[c]NaA = sodium acrylate.
[d]Pump discharge water was collected from C.B. Long Unit, Stonewall County, Texas (total dissolved solids = 18.5%).
[e]GS = gel strength.
[f]SG = slight gel, PG = partial gel.

TABLE XII

Gelation of 5000 ppm Am[a]:NaAMPS[b]:NaA[c] Copolymer (% H = 2.5) in Pump Discharge Water[d] at 120° F. with "ZIRTECH LA-110" at 250 ppm Zr ion

| Days Aged | Tongue Length (cm) | % GS[e] |
|---|---|---|
| 0.04 | PG[f] | PG |
| 0.08 | 8.3 | 63.1 |
| 0.13 | 7.2 | 68.0 |
| 0.19 | 6.5 | 71.1 |
| 0.23 | 6.6 | 70.7 |
| 0.90 | 5.6 | 75.1 |
| 2.20 | 4.5 | 80.0 |
| 10.15 | 2.7 | 88.0 |
| 17.04 | 2.7 | 88.0 |
| 22.17 | 2.4 | 89.3 |
| 43.00 | 2.1 | 90.7 |

Am:NaAMPS:NaA wt % = 47.5:50:2.5
[a]Am = acrylamide.
[b]NaAMPS = sodium-2acrylamido-2-methylpropanesulfonate.
[c]NaA = sodium acrylate.
[d]Pump discharge water was collected from C.B. Long Unit, Stonewall County, Texas (total dissolved solids = 18.5%).
[e]GS = gel strength.
[f]SG = slight gel, PG = partial gel.

TABLE XIII

Gelation of 5000 ppm Am[a]:NaAMPS[b]:NaA[c] Copolymer (% H = 5.0) in Pump Discharge Water[d] at 120° F. with "ZIRTECH LA-110" at 250 ppm Zr ion

| Days Aged | Tongue Length (cm) | % GS[e] |
|---|---|---|
| 0.05 | 7.8 | 65.3 |
| 0.10 | 6.6 | 70.7 |
| 0.16 | 5.4 | 76.0 |
| 0.94 | 4.0 | 82.2 |
| 3.90 | 3.2 | 85.8 |
| 7.90 | 3.0 | 86.7 |
| 13.90 | 2.6 | 88.4 |
| 20.20 | 2.7 | 88.0 |
| 33.00 | 2.6 | 88.4 |
| 43.00 | 2.5 | 88.9 |
| 81.00 | 2.4 | 89.3 |
| 181.00 | 2.5 | 88.9 |

Am:NaAMPS:NaA wt % = 45.0:50:5.0
[a]Am = acrylamide.
[b]NaAMPS = sodium-2acrylamido-2-methylpropanesulfonate.
[c]NaA = sodium acrylate.
[d]Pump discharge water was collected from C.B. Long Unit, Stonewall County, Texas (total dissolved solids = 18.5%).
[e]GS = gel strength.

TABLE XIV

Gelation of 5000 ppm Am[a]:NaAMPS[b]:NaA[c] Copolymer (% H = 10) in Pump Discharge Water[d] at 120° F. with "ZIRTECH LA-110" at 250 ppm Zr ion

| Days Aged | Tongue Length (cm) | % GS[e] |
|---|---|---|
| 0.05 | 4.4 | 80.4 |
| 0.09 | 3.5 | 84.4 |
| 0.23 | 3.0 | 86.7 |
| 0.89 | 2.5 | 88.9 |
| 3.90 | 2.1 | 90.7 |
| 8.20 | 3.0 | 86.7 |
| 13.90 | 2.9 | 87.1 |
| 17.90 | 2.6 | 88.4 |
| 23.90 | 2.4 | 89.3 |
| 30.00 | 2.5 | 88.9 |
| 43.00 | 2.8 | 87.6 |
| 53.00 | 2.0 | 87.6 |
| 91.00 | 3.1 | 91.1 |
| 191.00 | 2.6 | 86.2 |

TABLE XIV-continued

Gelation of 5000 ppm Am[a]:NaAMPS[b]:NaA[c] Copolymer (% H = 10) in Pump Discharge Water[d] at 120° F. with "ZIRTECH LA-110" at 250 ppm Zr ion

| Days Aged | Tongue Length (cm) | % GS[e] |
|---|---|---|

Am:NaAMPS:NaA wt % = 40.0:50:10.0
[a]Am = acrylamide.
[b]NaAMPS = sodium-2acrylamido-2-methylpropanesulfonate.
[c]NaA = sodium acrylate.
[d]Pump discharge water was collected from C.B. Long Unit, Stonewall County, Texas (total dissolved solids = 18.5%).
[e]GS = gel strength.

The results shown in the above examples indicate that for lower molecular weight polymers (<1,000,000) the degree of hydrolysis can be from 0.1 to about 10% to produce acceptable gels with a crosslinking agent. For higher molecular weight polymers (>1,000,000) a low degree of hydrolysis is preferred.

The results shown in the above examples also clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed is:

1. A composition comprising a carboxylate-containing polymer, a crosslinking agent and a liquid wherein said crosslinking agent does not contain a gelation-delaying agent; said crosslinking agent comprises at least one metal compound whose metal moiety is selected from the group consisting of Ti, Fe, Al, Zr, and combinations of any two or more thereof; said polymer contains an effective mole % of carboxylate groups and effective molecular weight to effect the delaying of gelation of said composition; said mole % is in the range of from about 0.01 to about 10% for polymer having a molecular weight smaller than 1,000,000; and said mole % is in the range of from about 0.01 to about 2% for polymer having a molecular weight greater than 1,000,000.

2. A composition according to claim 1 wherein said crosslinking agent is selected from the group consisting of zirconium complex of hydroxyethyl glycine, ammonium zirconium fluoride, zirconium 2-ethylhexanoate, zirconium acetate, zirconium tartarate, zirconium malonate, zirconium propionate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, titanium acetylacetonate, titanium ethylacetoacetate, titanium citrate, titanium triethanolamine, ammonium titanium lactate, aluminum citrate, and combinations of any two or more thereof.

3. A composition according to claim 2 wherein said crosslinking agent is selected from the group consisting of zirconium lactate, zirconium tartarate, zirconium malonate, zirconium propionate, zirconium citrate, tetrakis (triethanolamine)zirconate, zirconium complex of hydroxyethyl glycine, and combinations thereof.

4. A composition according to claim 1 wherein said liquid is a produced brine.

5. A composition according to claim 1 wherein said polymer is selected from the group consisting of biopolysaccharides, cellulose ethers, acrylamide-containing polymers, copolymers of acrylate and styrene sulfonate, partially hydrolyzed polyacylonitrile, polyacrylate, and combinations of any two or more thereof.

6. A composition according to claim 1 wherein said polymer containing an effective mole % of carboxylate groups for crosslinking with said crosslinking agent and is selected from the group consisting of polyacrylamide, partially hydrolyzed polyacrylamides, copolymers of acrylamide and N-vinyl-2-pyrrolidone, copolymers of acrylamide, acrylate, and N-vinyl-2-pyrrolidone, copolymers of acrylate and styrene sulfonate, copolymers of acrylamide and sodium 2-acrylamido-2-methylpropane sulfonate, copolymers of acrylamide, acrylate, and sodium 2-acrylamido-2-methylpropane sulfonate, copolymers of acrylamide, N-vinyl-2-pyrrolidone, and sodium 2-acrylamido-2-methylpropane sulfonate, copolymers of acrylamide, acrylate, N-vinyl-2-pyrrolidone, and sodium 2-acrylamido-2-methylpropane sulfonate, copolymers of acrylamide, sodium acrylate, and sodium 2-acrylamido-2-methylpropane sulfonate, carboxymethyl cellulose, carboxymethylhydroxyethyl cellulose, xanthan gum, and combinations of any two or more thereof.

7. A composition according to claim 1 wherein said polymer contains a carboxylate group in the range of from about 0.1 to about 1.0 mole %.

8. A composition according to claim 7 wherein said composition is prepared by combining said polymer, said crosslinking agent, and said liquid.

9. A composition according to claim 8 wherein said crosslinking agent is selected from the group consisting of zirconium lactate, zirconium tartarate, zirconium malonate, zirconium propionate, zirconium citrate, tetrakis (triethanolamine)zirconate, zirconium complex of hydroxyethyl glycine, and combinations thereof.

10. A composition according to claim 8 wherein the molecular weight of said polymer is in the range of from 10,000 to 20,000,000.

11. A composition according to claim 8 wherein said polymer is present in said composition in the range of from 1,000 to 50,000 mg/l.

12. A composition according to claim 8 wherein said polymer contains a carboxylate group in the range of from about 0.1 to about 1 mole % and the molecular weight of said polymer is in the range of from 10,000 to 20,000,000.

13. A composition according to claim 1 wherein said polymer contains a carboxylate group in the range of from about 0.1 to about 5.0 mole % and has a molecular weight less than about 1,000,000.

14. A composition according to claim 1 wherein said composition is prepared by combining said polymer, said crosslinking agent, and said liquid.

15. A composition according to claim 14 wherein said polymer contains a carboxylate group in the range of from about 0.01 to about 5 mole %.

16. A composition according to claim 14 wherein said polymer contains a carboxylate group in the range of from about 0.1 to about 1.0 mole %.

17. A composition according to claim 14 wherein said polymer contains a carboxylate group in the range of from about 0.1 to about 5.0 mole % and has a molecular weight less than about 1,000,000.

18. A composition according to claim 1 wherein the molecular weight of said polymer is in the range of from about 10,000 to about 30,000,000.

19. A composition according to claim 1 wherein said polymer is present in said composition in the range of from about 100 to about 100,000 mg/l.

20. A composition according to claim 1 wherein said polymer contains a carboxylate group in the range of from about 0.1 to about 1 mole % and the molecular weight of said polymer is in the range of from about 10,000 to about 25,000,000.

21. A gelling composition consisting essentially of:
a carboxylate-containing polymer having an effective mole % of carboxylate groups and effective molecular weight to effect the delaying of gelation of said composition wherein said mole % is in the range of from about 0.1 to about 10% for polymer having a molecular weight smaller than 1,000,000; said mole % is in the range of from about 0.01 to about 2% for polymer having a molecular weight greater than 1,000,000; and said polymer is selected from the group consisting of biopolysaccharides, cellulose ethers, acrylamide-containing polymers, copolymers of acrylate and styrene sulfonate, partially hydrolyzed polyacrylonitrile, and combinations of any two or more thereof;

a crosslinking agent selected from the group consisting of zirconium complex of hydroxyethyl glycine, ammonium zirconium fluoride, zirconium 2-ethylhexanoate, zirconium acetate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, zirconium tartarate, zirconium malonate, zirconium propionate, titanium acetylacetonate, titanium ethylacetoacetate, titanium citrate, titanium triethanolamine, ammonium titanium lactate, aluminum citrate, and combinations of any two or more thereof; and a liquid;

wherein said composition does not comprise a gelation delaying agent and said polymer is present in said composition in the range of from about 100 to about 100,000 mg/l and said crosslinking agent is present in said composition in the range of from about 1 to about 5,000 mg/l.

22. A composition according to claim 21 wherein said polymer is selected from the group consisting of polyacrylamide, partially hydrolyzed polyacrylamides, copolymers of acrylamide and N-vinyl-2-pyrrolidone, copolymers of acrylamide, acrylate, and N-vinyl-2-pyrrolidone, copolymers of acrylate and styrene sulfonate, copolymers of acrylamide and sodium 2-acrylamido-2-methylpropane sulfonate, copolymers of acrylamide, acrylate, and sodium 2-acrylamido-2-methylpropane sulfonate, copolymers of acrylamide, N-vinyl-2-pyrrolidone, and sodium 2-acrylamido-2-methylpropane sulfonate, copolymers of acrylamide, acrylate, N-vinyl-2-pyrrolidone, and sodium 2-acrylamido-2-methylpropane sulfonate, copolymers of acrylamide, sodium acrylate, and sodium 2-acrylamido-2-methylpropane sulfonate, carboxymethyl cellulose, carboxymethylhydroxyethyl cellulose, xanthan gum, and combinations of any two or more thereof; said polymer has a molecular weight in the range of from 10,000 to 20,000,000, contains a carboxylate group in the range of from about 0.1 to about 1 mole %, and is present in said composition in the range of from 1,000 to 50,000 mg/l; and said crosslinking agent is selected from the group consisting of zirconium complex of hydroxyethyl glycine, tetrakis(triethanolamine)zirconate, zirconium citrate, zirconium lactate, zirconium tartarate, zirconium malonate, zirconium propionate, and combinations thereof and is present in said composition in the range of from 1 to 2,000 mg/l.

23. A composition according to claim 22 wherein said polymer is selected from the group consisting of partially hydrolyzed polyacrylamides, copolymers of acrylamide, sodium acrylate, and sodium 2-acrylamido-2-methylpropane sulfonate, and combinations of any two or more thereof; and said crosslinking agent is zirconium lactate.

24. A composition according to claim 21 wherein said composition is prepared by combining said polymer, said crosslinking agent, and said liquid.

25. A composition according to claim 23 wherein said composition is prepared by combining said polymer, said crosslinking agent, and said liquid.

26. A composition according to claim 25 wherein said liquid is a produced brine.

27. A composition prepared by combining: (1) a polymer selected from the group consisting of partially hydrolyzed polyacrylamides, copolymers of acrylamide, sodium acrylate, and sodium 2-acrylamido-2-methylpropane sulfonate, and combinations of any two or more thereof wherein said polymer has a molecular weight in the range of from about 10,000 to about 20,000,000, has a carboxylate group in the range of from about 0.1 to about 1 mole %, and is present in said composition in the range of from 1,000 to 50,000 mg/l; (2) zirconium lactate which is present in said composition in the range of from 1 to 2,000 mg/l; and (3) a produced brine which makes up the rest of said composition.

* * * * *